No. 629,898. Patented Aug. 1, 1899.
G. FERRARIS & R. ARNO.
SYSTEM OF ELECTRICAL DISTRIBUTION.
(Application filed Oct. 26, 1895.)

(No Model.) 5 Sheets—Sheet 1.

Witnesses
H. VanOldenneel
E. A. Scott

Inventors
Galileo Ferraris
Riccardo Arno
by Richardson
Attorneys

No. 629,898. Patented Aug. 1, 1899.
G. FERRARIS & R. ARNO.
SYSTEM OF ELECTRICAL DISTRIBUTION.
(Application filed Oct. 26, 1895.)

(No Model.) 5 Sheets—Sheet 2.

Witnesses
H. van Oldennee[?]
E. A. Scott

Inventors
Galileo Ferraris
Riccardo Arno
by Richards
Attorneys

No. 629,898. Patented Aug. 1, 1899.
G. FERRARIS & R. ARNO.
SYSTEM OF ELECTRICAL DISTRIBUTION.
(Application filed Oct. 26, 1895.)
(No Model.) 5 Sheets—Sheet 4.
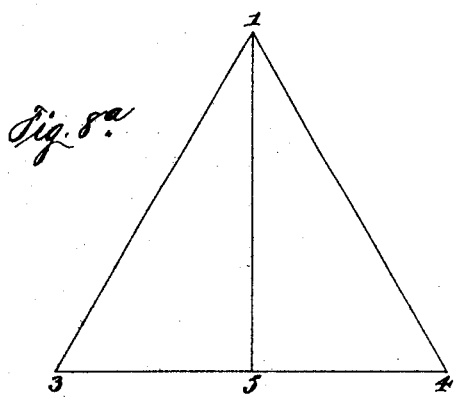
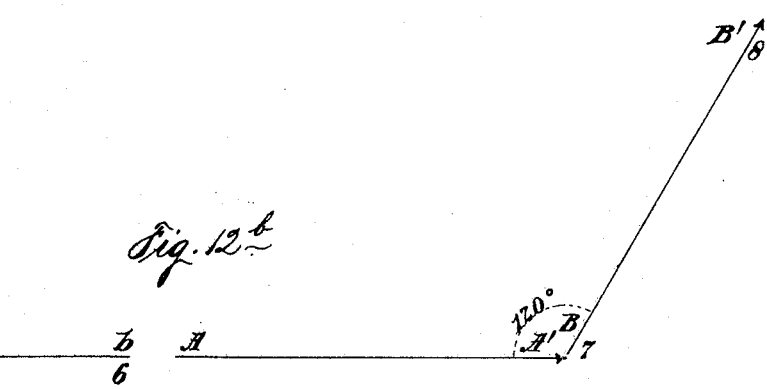
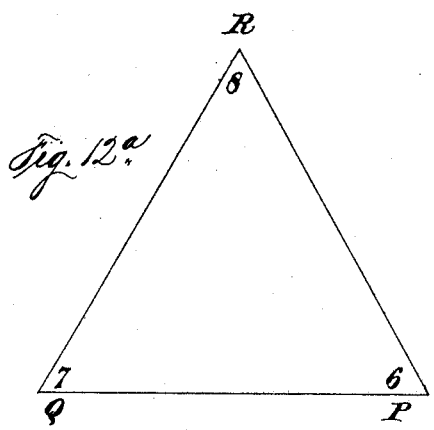
Witnesses:
B. J. Ober.
M. J. L. Higgins.
Inventors:
Galileo Ferraris
Riccardo Arno,
by No. 629,898. Patented Aug. 1, 1899.
G. FERRARIS & R. ARNO.
SYSTEM OF ELECTRICAL DISTRIBUTION.
(Application filed Oct. 26, 1895.)

(No Model.) 5 Sheets—Sheet 5.

Witnesses.
H. van Oldenneel
E. A. Scott

Inventors
Galileo Ferraris
Riccardo Arno
By Richards
Attorneys

UNITED STATES PATENT OFFICE.

GALILEO FERRARIS AND RICCARDO ARNO, OF TURIN, ITALY.

SYSTEM OF ELECTRICAL DISTRIBUTION.

SPECIFICATION forming part of Letters Patent No. 629,898, dated August 1, 1899.

Application filed October 26, 1895. Serial No. 567,007. (No model.)

*To all whom it may concern:*

Be it known that we, GALILEO FERRARIS and RICCARDO ARNO, residing at Turin, Italy, have invented certain new and useful Improvements in Systems of Electrical Distribution; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

Our invention relates to systems of electrical distribution, and is particularly useful in cases where it is desired to furnish light and power from the same main. By our improvements we are able to accomplish this result with great convenience and efficiency and avoid the unbalancing troubles incident to commercial multiphase systems.

Our improved system is based on the use of a phase-displacing transformer, and we prefer to use the transformer described in our application Serial No. 547,975, though we are not in any way restricted thereto. This transformer consists, broadly, of an inducing member with several windings, one of them connected to a source of single-phase current and an induced member preferably short-circuited. One of these two members is capable of rotation relative to the other. It may, in fact, be an ordinary single-phase induction-motor with extra coils wound on the inducing member at an angle with the primary coils, so as to furnish an out-of-phase electromotive force.

Figure 1:
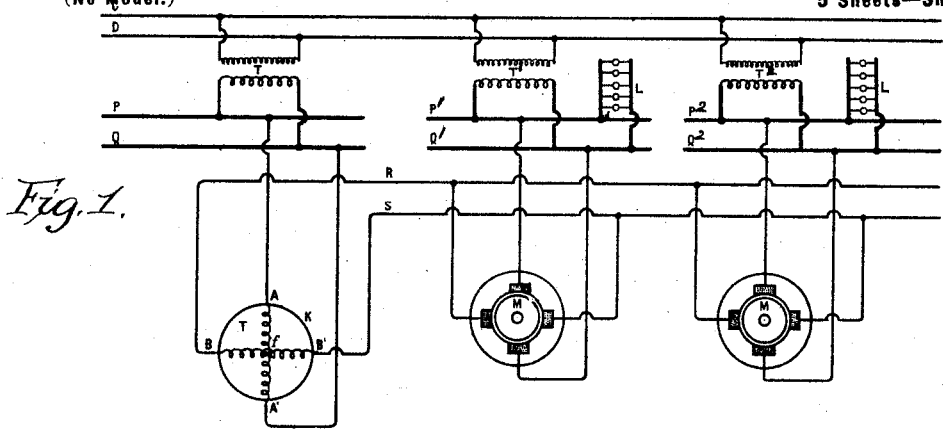
Figure 2:
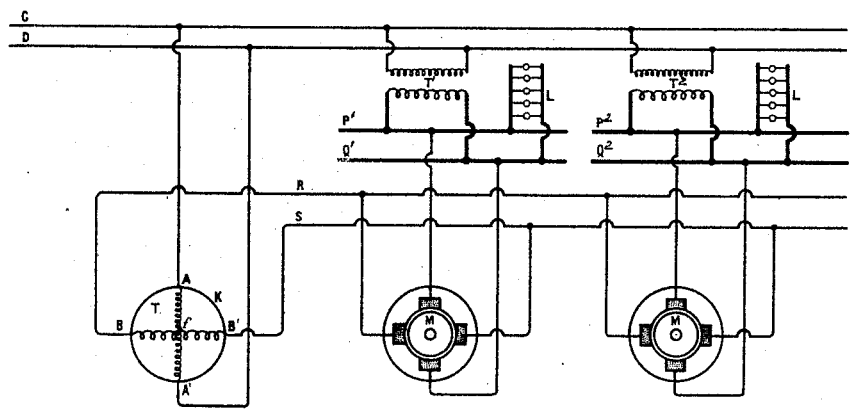
Figure 3:
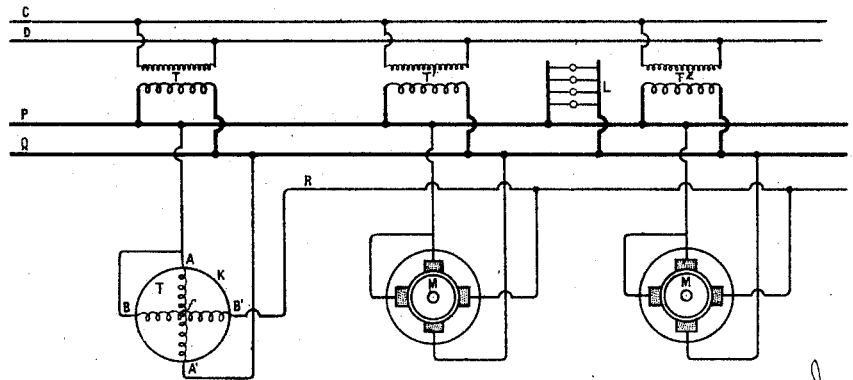
Figure 4:
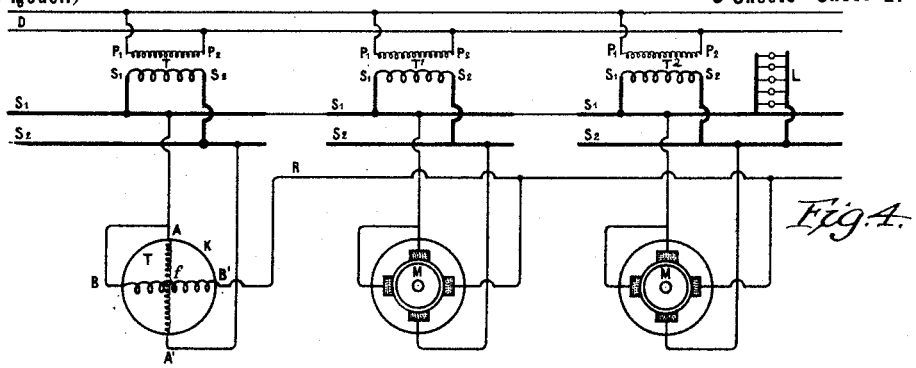
Figure 5:
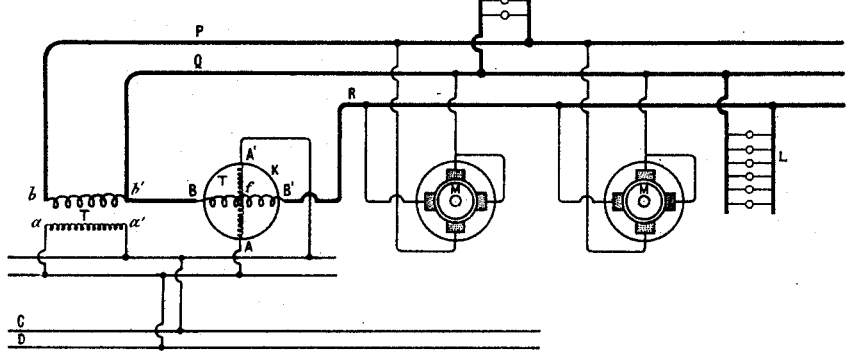
Figure 6:
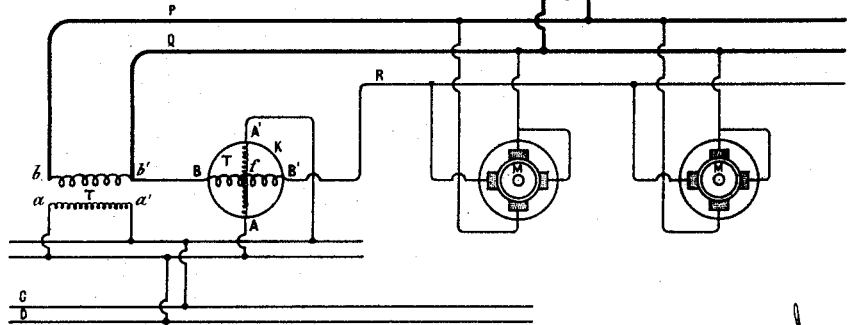
Figure 7:
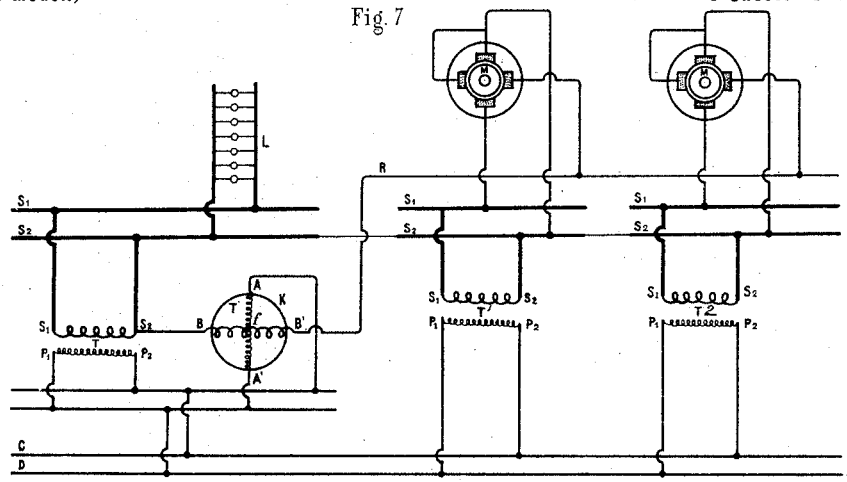
Figure 8:
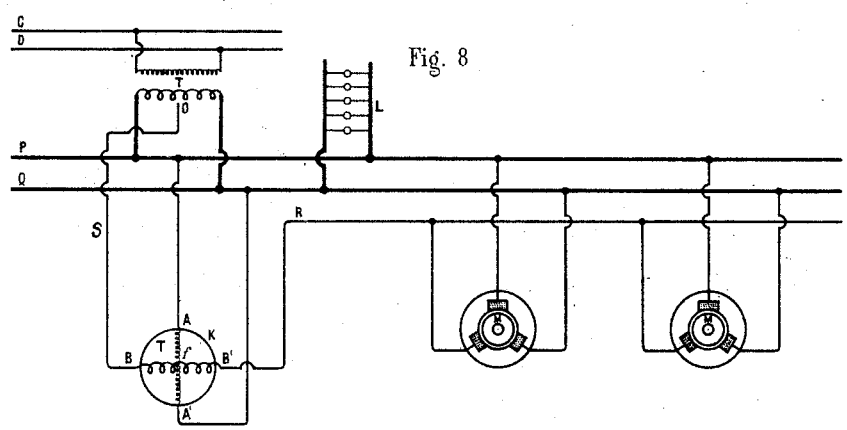

In the drawings attached to this specification, Figure 1 is a diagram of a biphase system of distribution involving our improvements in a simple form. Fig. 2 is a similar diagram of a biphase system in which the transformer is connected direct to the high-tension mains. Fig. 3 is a diagram of a biphase system in which the number of extra wires is reduced to one. Fig. 4 is a diagram of a similar interconnected biphase system. Fig. 5 is a diagram of an interconnected biphase system with lamps on both sides. Fig. 6 is a diagram of a similar system in which all the lamps are on the single-phase mains. Fig. 7 is a diagram of a system in which only one wire leads from the phase-displacing transformer. Figs. 8, 9, 10, 11, and 12 show various ways of obtaining and connecting three-phase systems with only two coils on the phase-displacing transformer. Figs. 8$^a$, 12$^a$, and 12$^b$ are explanatory diagrams showing the phases of the secondary electromotive forces in Figs. 8 and 12, respectively.

Like letters and figures refer to corresponding parts throughout the specification.

In Fig. 1, C D represent wires connected to a source of single alternating current. They may be the two mains of an ordinary high-tension single-phase system. P Q are the wires of the secondary network, and T$^f$ the phase-displacing transformer. This transformer is shown as consisting of two coils—a primary A A' and a secondary B B'—which are at right angles to each other, and a short-circuited armature K, which is driven by the primary current in the coil A A'. It is of course obvious that we intend to include within the scope of our invention well-known equivalents of our phase-displacing transformer. If now a double conductor R S is led from the terminals of the secondary coil B B' of the phase-displacing transformer T$^r$, an alternating current of displaced phase is obtained upon the wires R S, which may be made of any voltage desired by suitably winding the coil B B'; but in the system shown in this figure we prefer to make the voltage on R S equal to that on P Q and displaced from it ninety degrees. Thus a four-branched low-tension biphase system is obtained, consisting of the wires P Q R S, &c. It is evident that the wires P Q are equivalent to the wires P' Q' so far as phase is concerned, neglecting slight variations due to changes in load, and a single-phase-displacing transformer preferably at or near the center will suffice for a system of considerable extent, though it may be duplicated where desired. Translating devices of various sorts, as the motors M M and lamps L L, are connected in where desired.

Fig. 2 shows a similar system in which the transformation of voltage effected in Fig. 1 by the transformer T takes place in the phase-displacing transformer itself. The transformation of voltage takes place in this modified system by having the turns and cross-section of the primary and secondary windings of the phase-transformer so proportioned as to any desired ratio of transformation as to produce the desired voltage in the secondary circuit from the given primary voltage. Thus a primary winding of very many turns of fine wire with a secondary winding of a few turns of a relatively very coarse wire would obviously result in the production in the secondary circuit of a materially decreased voltage and increased amperage. The proper ratio of transformation is determined by the requirements of any particular system. Otherwise the system is similar to that already described. But we prefer to provide an arrangement by which a single wire only need lead from the phase-displacing transformer to those of the translating devices requiring multiphase current.

Fig. 3 shows a system wherein the wires corresponding to the wires P' Q' P² Q², &c., in Fig. 2 are joined in a continuous circuit and with the wires R S, as shown in Fig. 2, changed to a single return-wire R by suitable intercommunication, as shown.

In Fig. 4 the wires corresponding to the wires P P', &c., in the other figures are joined, which is sufficient in many cases and results in a saving of copper. In this case the wire P between the subcenters or local distributing-points carries only the motor-current and should have the same cross-section as that of the wire R.

Fig. 5 shows a method of conection in which the secondaries of the transformers T and T' are connected in series, and wires P Q R are led off from the terminals and from the intermediate point. It will be seen that we have here a three-wire system which differs from the ordinary three-wire system in that the currents in the two sides are displaced in phase. Lamps may be placed as is usual in three-wire systems, and the two transformers should preferably be of equal capacity and so built as to have the same secondary voltages.

In Fig. 6 the same arrangement is shown, but the transformer T' is of a capacity to supply its share of current to the multiphase-translating devices only, and the single-phase-translating devices are connected to the leads which come from the transformer T only.

Fig. 7 is a combination of the devices shown in Figs. 4 and 6, by which the amount of copper required may be still further reduced.

Figure 9:
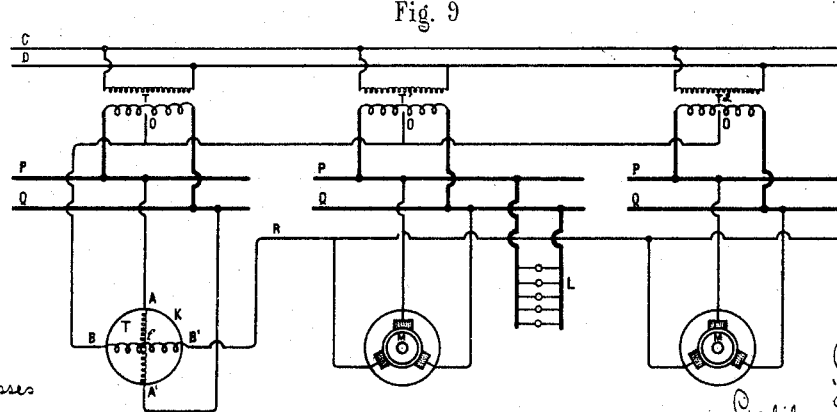

For producing three-phase currents several connections are possible. Fig. 8 shows perhaps the simplest and is to be read in connection with Fig. 8ª. T is the single-phase transformer; M M, the three-phase motors; L L, the lamps, and T' the phase-displacing transformer. Let 1 5 in Fig. 8ª be the vector, representing in magnitude and phase the secondary electromotive force of the phase-displacing transformer. It will be noticed that the secondary of the transformer T is tapped in the center by the wire S. Then the vector 3 4 will represent the electromotive force of the secondary of T, ninety degrees in phase from that of T'. The electromotive force from R to P is that of the phase-displacing transformer plus half of that of the secondary winding of T, or, in the diagram, 1 5 plus 5 3 or 1 3, according to the usual rules for the addition of vectors. The electromotive force from R to Q is 1 5 minus half 3 4, or 1 5 plus 5 4, or 1 4. That between P and Q is 3 4, which is equal in magnitude to 1 3, and we have three sides of an equilateral triangle and therefore a symmetrical three-phase system. When the transformer T is duplicated, the central points of all the secondaries should be connected together, as shown in Fig. 9.

Figure 10:
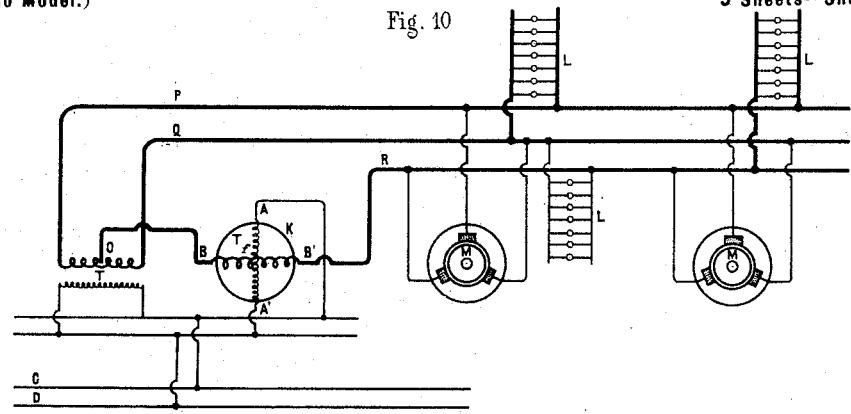
Figure 11:
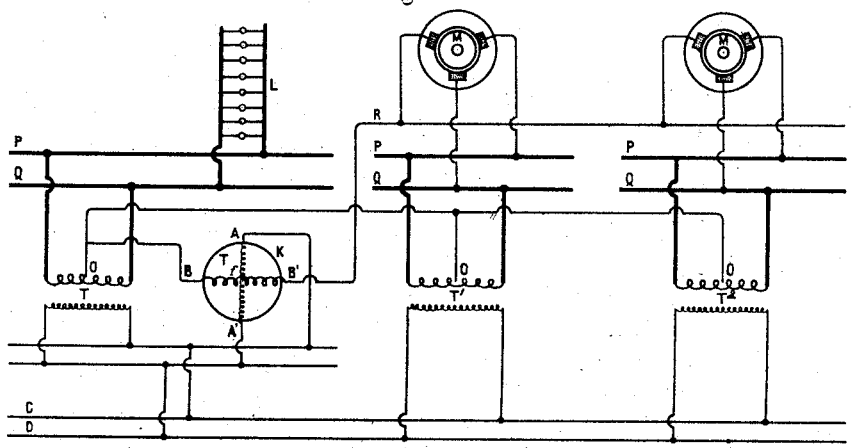

In Figs. 10 and 11 the phase-displacing transformers are connected direct to the high-tension mains; but otherwise the systems are similar to those already described.

Figure 12:
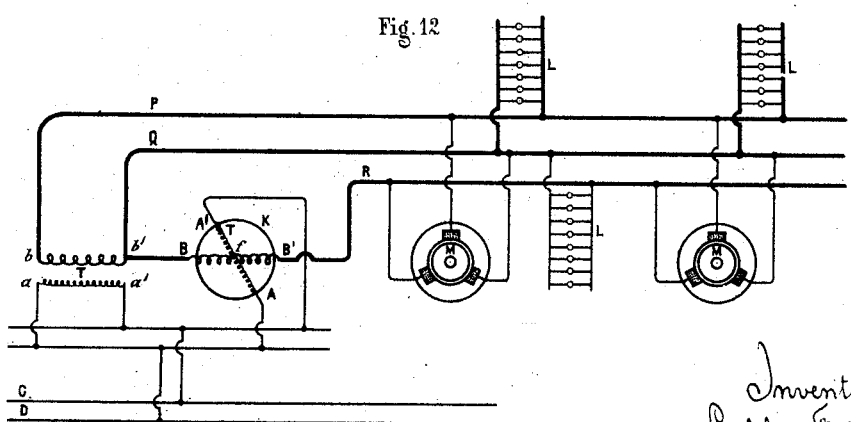

Fig. 12 and the corresponding diagram Figs. 12ª and 12ᵇ show how a three-phase system may be obtained by placing on phase-displacing transformer a secondary coil at an acute or obtuse angle from the primary. A A' is the primary coil, and B B' the secondary, as before. The electromotive force from P to Q may be represented by the vector 6 7, Fig. 12ª, while the electromotive force from B' to B or from Q to R may be represented by 7 8. The resultant 8 6 will then represent the electromotive force from P to R. This will be apparent when we consider the various electromotive forces in connection with Figs. 12ª and 12ᵇ. For example, as the coil $b\ b'$ is the secondary winding of a transformer T we can assume that its electromotive force will be approximately one hundred and eighty degrees displaced in direction from the electromotive force in the coil $a\ a'$, the primary of the transformer T, and as the electromotive force in B B' acting in the circuit Q R is one hundred and twenty degrees displaced from the current in the primary main-line circuit or the current in A A' it is obviously displaced two hundred and forty degrees from the electromotive force in the coil $b\ b'$, and hence we can, as above, represent the electromotive force in P Q as having the direction $b\ b'$, and the electromotive force in Q R by B B', and the resultant electromotive force by R P. As B is connected to $b'$ we can assume the line 7 8 is connected to the line 6 7 at the point 7, and on completing the triangle by making the electromotive forces of the proper relative amounts we have an equilateral triangle and a symmetrical three-phase system.

As before stated, our invention as set forth in this application resides in a system of electrical distribution, and we do not limit ourselves to any specific transformer, but may use any dephasing-transformer whatever which will be suitable. Neither do we limit ourselves to the specific arrangements and connections shown, but refer for the scope of our invention to the following claims. In these claims we have used the expression "ordinary transformer," by which we mean any transformer whatever which acts as does the commercial single-phase transformer—that is, simply changes voltage without reference to the lag of the currents or electromotive forces. It is true that in the ordinary transformer the secondary current is not in phase with the primary electromotive force, but as it is about one hundred and eighty degrees behind it the effect is practically the same.

We claim as our invention—

1. In a single-phase alternating-current system, of electric distribution, the combination of the high-tension mains, of an ordinary transformer, of the secondary conductors thereof, of a voltage and phase transformer having two relatively movable elements, one of which has wound thereon coils closed upon themselves connected directly to the high-tension mains, of a connection between the secondary coil of the voltage and phase transformer to the secondary coil of the ordinary transformer, and of a single secondary conductor leading from the other terminal of the secondary coil of the voltage and phase transformer and forming with the secondary conductors of the ordinary transformer a three-branched two-phase low-tension system, substantially as described.

2. In an alternating-current system of electric distribution, the combination of the high-tension mains, of an ordinary transformer, of the secondary conductors thereof, of a voltage and phase transformer connected directly to the high-tension mains, of a connection between one terminal of the secondary coil of the voltage and phase transformer to the central point of the secondary coil of the ordinary transformer, and of a single secondary conductor leading from the other terminal of the secondary coil of the voltage and phase transformer and forming with the secondary conductors of the ordinary transformer a three-branched three-phase low-tension system, substantially as described.

3. In a system of electrical distribution the combination of a plurality of single-phase transformers, connections from the secondaries to translating devices, a conductor joining one end of all of said secondaries, a tension and phase displacing transformer having primary and secondary windings independent of each other, connected to the translating devices and the secondary mains, substantially as described.

4. In a system of electrical distribution, the combination of an ordinary transformer, secondary conductors leading therefrom, a tension and phase displacing transformer having primary and secondary windings, and connected to one of said secondary conductors, and a third wire leading from said phase-displacing transformer to the translating devices, substantially as described.

5. In a system of electrical distribution the combination of a single-phase transformer and a phase-displacing transformer, and a connection from the secondary of the phase-displacing transformer to an intermediate point in the secondary of the single-phase transformer, substantially as described.

6. In a system of electrical distribution the combination of an ordinary transformer and a phase-displacing transformer, and a connection from one terminal of one of said transformers to an intermediate point in the winding of the other, substantially as described.

7. The combination of a source of single-phase currents, an ordinary transformer, and a tension and phase displacing transformer having stationary and rotary elements and having independent secondary windings, and connections between the secondaries of said transformers whereby three-phase current is supplied to the translating devices, substantially as described.

8. In a system of electrical distribution, the combination of single-phase mains, an ordinary transformer connected thereto, secondary conductors leading therefrom, a phase-displacing transformer with its secondary connected to the secondary network, and a conductor joining predetermined appropriate points in the secondaries of both transformers, substantially as described.

9. In a system of electrical distribution, the combination of single-phase mains, a tension and phase displacing transformer having rotary and stationary elements, a tension-reduction transformer connected thereto, and a three-wire system connected to the secondaries of said transformers, substantially as described.

10. The method of producing multiphase currents from single-phase currents, which consists in generating alternating single-phase electric currents, transmitting them to any desired point or points, producing by the said currents at the said point or points relative rotation of magnetic media with relation to each other, generating by the rotation of the said magnetic media out-of-phase electromotive forces or currents, combining said out-of-phase electromotive forces or currents with the electromotive forces or currents of the single-phase system in proper proportion so as to produce electromotive forces of a desired phase angle, and so combining these electromotive forces in various circuits as to produce in said circuits multiphase currents of a phase angle different from that existing between the single-phase electromotive forces and the out-of-phase electromotive forces.

11. The method of producing multiphase currents from single-phase currents, which consists in generating alternating single-phase electric currents, transmitting them to any desired point or points, producing by the said currents at the said point or points relative movement of stationary and moving circuits with relation to each other, generating by the movement of the said stationary and moving circuits out-of-phase electromotive forces or currents, combining said out-ofphase electromotive forces or currents with the electromotive forces or currents of the single-phase system in proper proportion so as to produce electromotive forces of a desired phase angle, and so combining these electromotive forces in various circuits as to produce in said circuits multiphase currents of a different number of phases.

12. The method of producing multiphase currents from single-phase currents, which consists in generating alternating single-phase electric currents, transmitting them to any desired point or points, producing by the said currents at the said point or points relative rotation of the elements of an induction-motor with relation to each other, generating by the rotation of the said elements of an induction-motor out-of-phase electromotive forces or currents, combining said out-of-phase electromotive forces or currents with the electromotive forces or currents of the single-phase system in proper proportion so as to produce electromotive forces of a desired phase angle, and so combining these electromotive forces in various circuits as to produce in said circuits multiphase currents of a different number of phases from the currents flowing in the two stationary circuits of the phase-transformer.

13. The method of producing multiphase currents of one order from multiphase currents of another order, which consists in producing electromotive forces, producing electromotive force or forces of different phase by the relative movement of circuits having inductive relation to each other, combining the said first electromotive force or forces with the second electromotive force or forces in the desired proportion, producing multiphase secondary electromotive forces, and causing said secondary electromotive forces to produce in circuits properly interrelated multiphase currents of a different number of phases from the primary multiphase electromotive forces.

In testimony that we claim the foregoing as our invention we have signed our names in presence of two subscribing witnesses.

GALILEO FERRARIS.
RICCARDO ARNO.

Witnesses:
 RAFFAELE ROSE,
 EDOARDO RIVOLTO.